(12) United States Patent
Paluncic et al.

(10) Patent No.: US 7,726,448 B2
(45) Date of Patent: Jun. 1, 2010

(54) DISTRIBUTING ELEMENT FOR LUBRICATING SYSTEMS

(75) Inventors: Zdravko Paluncic, Ludwigshafen (DE); Andreas Schönfeld, St. Leon-Rot (DE)

(73) Assignee: Lincoln GmbH, Walldorf (DE)

( * ) Notice: Subject to any disclaimer, the term of this patent is extended or adjusted under 35 U.S.C. 154(b) by 1387 days.

(21) Appl. No.: 10/524,033

(22) PCT Filed: Aug. 22, 2003

(86) PCT No.: PCT/EP03/09338

§ 371 (c)(1),
(2), (4) Date: Feb. 9, 2005

(87) PCT Pub. No.: WO2004/113784

PCT Pub. Date: Dec. 29, 2004

(65) Prior Publication Data

US 2005/0258004 A1 Nov. 24, 2005

(30) Foreign Application Priority Data

Jun. 21, 2003 (DE) ............................ 203 09 553

(51) Int. Cl.
*F16N 11/08* (2006.01)
*F16N 27/00* (2006.01)
(52) U.S. Cl. ...................... 184/41; 184/7.4; 184/55; 184/1
(58) Field of Classification Search .............. 184/7.4, 184/41, 55, 1
See application file for complete search history.

(56) References Cited

U.S. PATENT DOCUMENTS 1,652,764 A * 12/1927 Cowles ................... 184/7.2

2,550,535 A * 4/1951 Davis ....................... 184/7.4

(Continued)

FOREIGN PATENT DOCUMENTS

DE 198 43 695 4/2000

*Primary Examiner*—Bradley T King
*Assistant Examiner*—Mahbubur Rashid
(74) *Attorney, Agent, or Firm*—Wenderoth, Lind & Ponack, L.L.P.

(57) ABSTRACT

A distributor element, in particular a feed distributor, is provided for the metering of lubricants for lubricating installations. The element includes a valve piston featuring a bore. The valve piston moves under the pressure of a lubricant operating at a lubricant inlet against the force of a first return spring from a starting position in which the bore releases a connection between a dispensing chamber and a metering chamber via a connecting passage, to a metering position in which the valve piston releases a passage from the lubricant inlet to the connecting passage and therefore to the metering chamber. Furthermore, the distributor element features a dispensing piston which under the effect of a lubricant entering the metering chamber moves against the force of a second return spring from a starting position and thereby pushes the lubricant volume present in the dispensing chamber between the valve piston and the dispensing piston into a lubricant outlet. The valve piston may also be moved into an intermediate position until equalization of pressure has occurred, in which position the valve piston blocks the passage from the lubricant inlet to the connecting passage and therefore to the metering chamber. Upon pressure relief at the lubricant inlet, the valve piston is moved back to its starting position by the first return spring and the dispensing piston is moved back to its starting position by the second return spring.

9 Claims, 2 Drawing Sheets

U.S. PATENT DOCUMENTS

| | | | | |
|---|---|---|---|---|
| 2,556,968 A | * | 6/1951 | Jakobsen | 184/7.4 |
| 2,627,320 A | * | 2/1953 | Rotter | 184/7.4 |
| 2,627,939 A | * | 2/1953 | Leonard | 184/7.4 |
| 2,712,364 A | * | 7/1955 | Laspe | 184/39.1 |
| 3,490,701 A | * | 1/1970 | Malec | 239/584 |
| 3,664,462 A | * | 5/1972 | Smith, Sr. | 184/7.4 |
| 3,898,808 A | * | 8/1975 | Ewald et al. | 60/403 |
| 4,397,376 A | * | 8/1983 | Saretzky | 184/7.4 |
| 6,145,625 A | | 11/2000 | Prokop et al. | |
| 6,276,492 B1 | | 8/2001 | Carroll | |
| 6,490,701 B1 | * | 12/2002 | Roohparvar et al. | 714/721 |
| 6,827,299 B2 | * | 12/2004 | Scotchmur et al. | 239/583 |
| 2002/0112759 A1 | * | 8/2002 | Jaeger | 137/237 |
| 2003/0089553 A1 | * | 5/2003 | Conley et al. | 184/7.4 |

\* cited by examiner

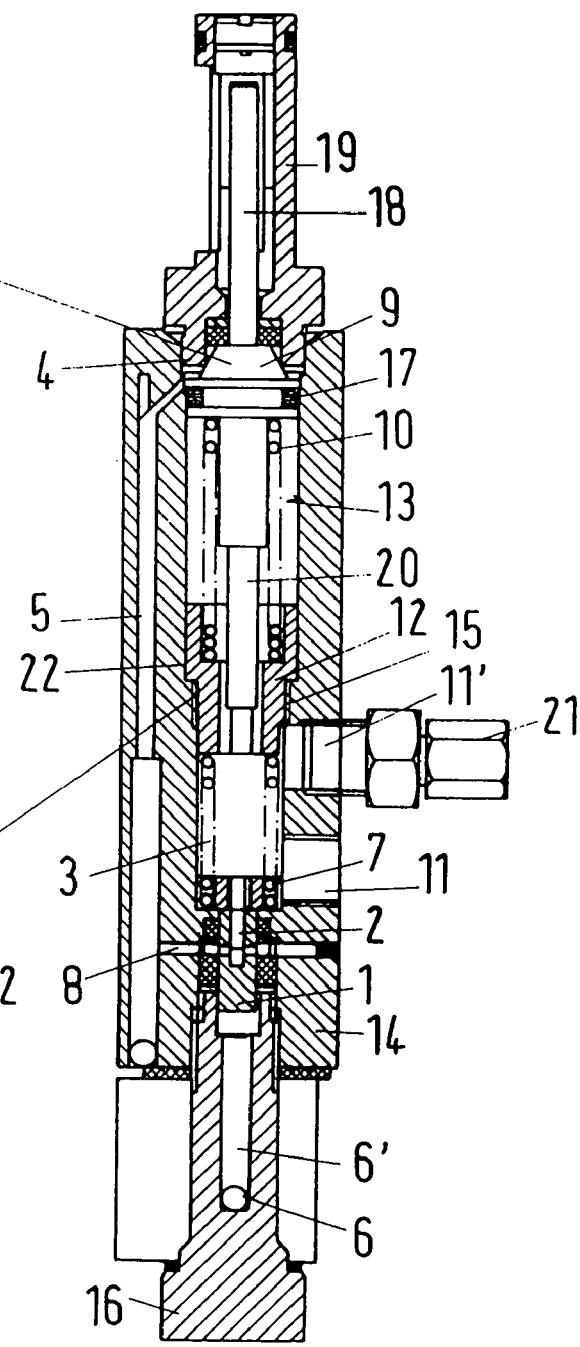
Fig.1
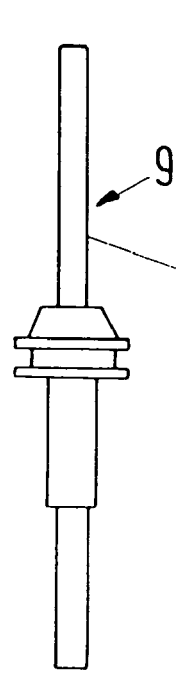
Fig.1A
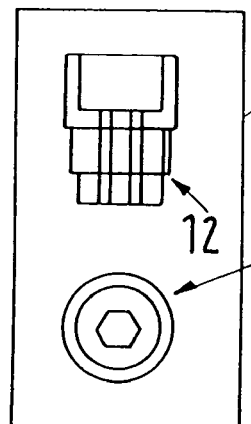
Fig.1B₁
Fig.1B₂

DISTRIBUTING ELEMENT FOR LUBRICATING SYSTEMS

BACKGROUND OF THE INVENTION

The invention concerns a distributor element, particularly a feed distributor, for metering lubricants like grease for lubricating installations.

A known lubricant distributor of this type features a valve piston with a bore. The valve piston moves under the lubricant pressure operating at a lubricant inlet against the force of a single return spring from a starting position in which the bore releases a connection via a connection passage from a metering chamber to a dispensing chamber, to a metering position in which the valve piston releases a passage from the lubricant inlet to the connecting passage and therefore to the metering chamber. Additionally, this lubricant distributor has a dispensing piston which can be moved against the force of the only return spring under the effect of lubricant entering the metering chamber. As a result of the lubricant pressure building up in the metering chamber, the lubricant volume present in the dispensing chamber between the valve piston and the dispensing piston is pushed into at least one lubricant outlet and the valve piston is moved by the dispensing piston into an intermediate position until pressure equalization has occurred, in which position the valve piston blocks the passage from the lubricant inlet to the connecting passage and therefore to the metering chamber. Upon a subsequent pressure relief at the lubricant inlet the valve piston and also the dispensing piston are returned to their starting position by the only return spring. A disadvantage of such a distributor element is that the hydraulic lubricant pressure (working pressure) of e.g. up to 250 bar operating at the valve inlet, must be reduced to a relatively low residual pressure of e.g. about 45 bar for the required pressure relief to ensure reliable operation.

The known design, in particular if several lubricant distributors are connected in series, can lead to impaired functioning of the last lubricant distributor because of pressure reduction occurring in the lubricant line. The problem of a too low relief pressure cannot be solved by strengthening the only return spring provided in this state of the art, because this does not only cooperate with the valve piston but in the other direction also with the dispensing piston. A stronger return spring would lead to an increase of the pressure which must move the dispensing piston into its final position.

SUMMARY OF THE INVENTION

The purpose of the present invention is to propose a distributor element of the type described in which the relief pressure (residual pressure) is significantly higher e.g. about twice as high as that of the known distributor element and yet without an increase of the minimum operating pressure i.e. the pressure at which the dispensing piston is in its displaced final position.

The invention essentially achieves this purpose with a distributor element for metering of lubricants like grease, for lubricating installations, featuring a valve piston with a bore. The valve piston moves under the pressure of a lubricant operating at a lubricant inlet against the force of a first return spring from a starting position in which the bore releases a connection between a dispensing chamber and a metering chamber via a connecting passage to a metering position in which the valve piston releases a passage from the lubricant inlet to the connecting passage and therefore the metering chamber. Additionally, the invention proposes a dispensing piston which, under the effect of lubricant entering the metering chamber, moves against the force of a second return spring so that the lubricant volume present in the dispensing chamber between the valve piston and the dispensing piston is pushed into at least one lubricant outlet. The valve piston may also be moved into an intermediate position until pressure equalization has occurred, in which position the valve piston blocks the passage from the lubricant inlet to the connecting passage and therefore to the metering chamber. Upon pressure relief at the lubricant inlet, the valve piston is moved back to its starting position by the first return spring and the dispensing piston is moved back to its starting position by the second return spring.

Because of the higher residual pressure proposed by the invention, shorter switching times are achieved and lines of greater length and/or smaller diameter can be used which saves costs. At the same time the minimum operating pressure can be kept low. Spring force and spring characteristics of the two return springs can be separately dimensioned as a function of the diameter of the pistons, bores and passages.

As we have seen in comparison to the state of the art, the invention proposes that the only return spring be replaced by two separately functioning return springs. Now the first return spring only works together with the valve piston, whereas the second spring only takes care of the return of the dispensing piston. The dimensioning of the return springs can depend on the available conditions e.g. as a function of the length and diameter of the lines used, metering volumes, operating pressures, residual pressures and the like. Thus it becomes possible to achieve in a simple manner that the minimum operating pressure is not increased but can be kept low despite the increase in the residual pressure.

In a constructionally particularly simple manner, the solution as per the invention can be realized in an embodiment by the fact that an essentially hollow cylindrical supporting body for both return springs is arranged between the first and second return spring. The passage that may be present in the supporting body permits an extension of the dispensing piston facing the valve piston so that when the dispensing piston is actuated by the pressure built up in the metering chamber, the valve piston can first be moved by the dispensing piston into an intermediate position in relation to its starting position in which the lubricant inlet is separated from the connecting passage.

In a further embodiment of the invention the valve piston, dispensing piston, supporting body and the two return springs are arranged in a mutually axial configuration in a common straight passage of a valve housing in order to simplify the manufacture and improve the functionality.

Advantageously, in order to save space and provide reliable support, the second return spring is a spiral coiled spring mounted around the dispensing piston.

In another embodiment of the invention, the fact that the second return spring, being a spiral coiled spring, is in any case with the end that faces the valve piston, mounted around the first return spring which is also a spiral coiled spring, achieves that at a specified length of the return springs the total length of the distributor element can be short.

In this situation, it is advantageous if the first return spring being a spiral coiled spring is housed with the end that faces the dispensing piston in a cylindrical supporting body which is surrounded by the second return spring which is also a spiral coiled spring. The first return spring can then be braced on a radially inward projecting flange at the end of the cylindrical supporting body opposite the valve piston and is accommodated in the cylindrical supporting body. Conversely, the second return spring can rest against the outside of the cylindrical supporting body and be braced on a radially outward projecting bottom flange of the cylindrical supporting body.

The supporting body itself can rest against a bearing shoulder of the valve housing facing away from the valve piston.

BRIEF DESCRIPTION OF THE DRAWINGS

Further purposes, features, advantages and application possibilities of the invention become clear from the following description of embodiments with reference to the drawings. All features described and/or graphically displayed, individually or in any combination, are the subject of the invention, also independent of their being summarized in individual claims or their cross-reference.

FIG. 1 Partial section through the longitudinal center plane of a valve element designed as a feed distributor as proposed by the invention in accordance with an embodiment.

FIG. 1A Side view of the dispensing piston taken from FIG. 1.

FIG. $1B_1$ and $1B_2$ Side view and top view of the supporting body taken from FIG. 1

Figure 2:
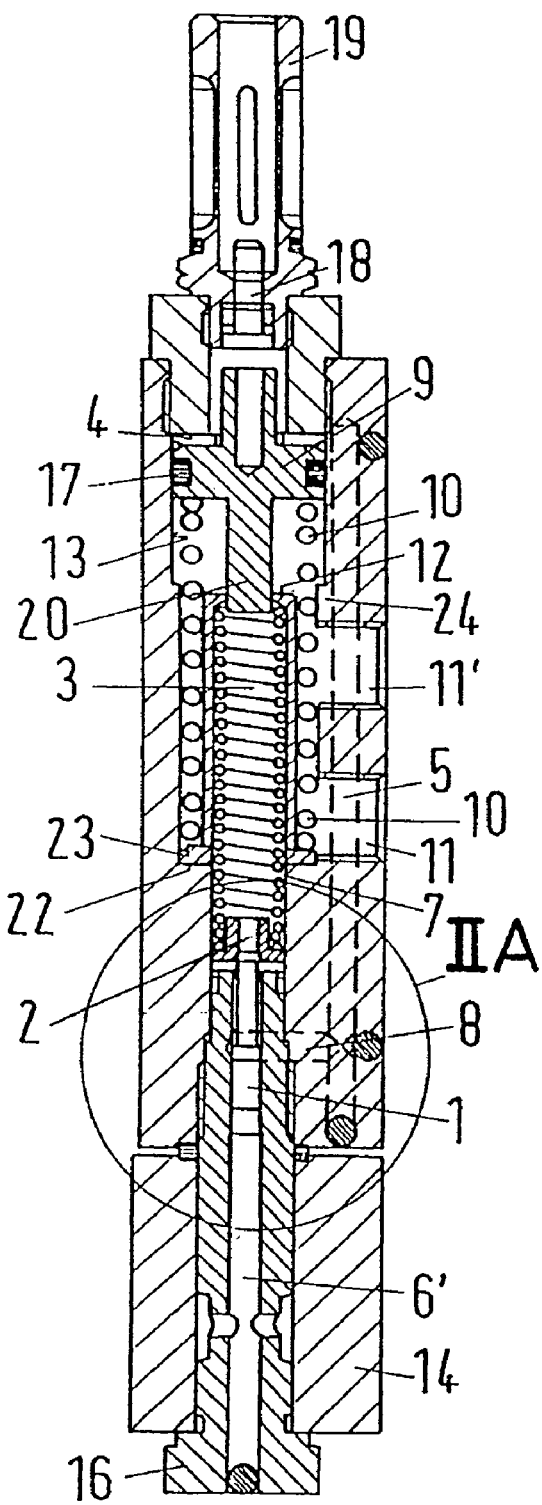
Figure 2A:
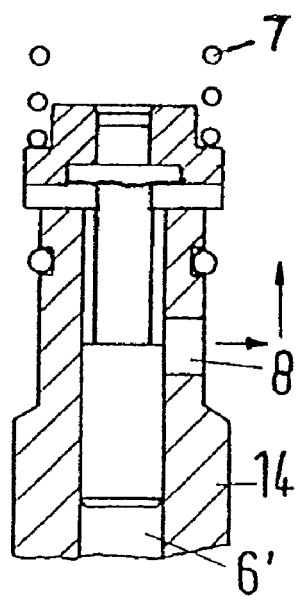

FIG. 2 Representation as per FIG. 1 of another embodiment of a distributor element as per invention and FIG. 2A Representation of the detail IIA from FIG. 2

DETAILED DESCRIPTION OF THE INVENTION

The feed distributor for metering lubricants e.g. grease shown in the drawings for feed lubricating installations has a distributor housing 14 with a passage 13 extending over the length of the housing 14. In the lower end of the housing 14, a sealing element 16 with a lubricant inlet 6 is screwed in. The lubricant inlet 6 opens in to an axial inlet passage 6' that leads to valve piston 1. This valve piston 1 is axially displaceable in the passage 13 and is braced on the side opposite the lubricant inlet 6 on the first return spring 7 which is coaxially arranged in the passage 13. The first return spring 7 rests with its end that is opposite the valve piston 1 against a first support surface of a hollow cylindrical supporting body 12 which is axially fixed in a defined position within the housing 14 in the passage 13 by a threaded connection 15 and bearing shoulder 22.

In FIG. 1, the valve piston 1 is in its intended starting position at the beginning of a lubricating cycle, which position the valve piston 1 reaches at the end of the preceding lubricating cycle and in a lubricating interval that may follow. In the embodiment shown, the valve piston 1 has a transverse bore 2 which on one side communicates via an axial bore section with a dispensing chamber 3 in the passage 13 before the valve piston 1 and on the other side via a radial bore section with a passage 8 radially aligned in the valve housing 14. The passage 8 leads into a connecting passage 5 extending longitudinally extending parallel to the connecting passage 3.

The connecting passage 5 leads at its upper end i.e. the end opposite the valve piston 1 into a metering chamber 4 which inside the passage 13 is delimited in relation to the valve piston 1 by a dispensing piston 9 equipped with a peripheral seal 17. The dispensing piston 9 is braced towards the valve piston 1 by a second return spring 10 on the side of the supporting body 12 opposite the valve piston 1 against a second support surface opposite the first support surface.

In the starting position shown in FIG. 1, the dispensing piston 9 may extend into an upper laterally open sealing body with a check pin for visual function display. Towards the valve piston 1, the dispensing piston 9 may have an extension 20 to enable the valve piston 1 to first move into an intermediate position at the end of the lubricating cycle before reaching its starting position as described below. The valve housing 14 has at least one lubricant outlet 11 which in the starting position of the valve piston 1 shown in FIG. 1 is situated immediately before the front end of the valve piston facing the dispensing piston. A lubricant passage 11' equipped with a screw plug 21 may serve for filling the distributor element with lubricant.

The operation of the distribution element is as follows:

In the lubricant interval phase shown in FIG. 1, the pressure operating at the lubricant inlet 6 of the distributor element has been reduced to a residual pressure. The two return springs 7, 10 are relaxed to the relevant desired and accordingly dimensioned initial tension. The dispensing chamber 3—after first being filled through a lubricant passage 11'—is filled with lubricant by the preceding lubricating cycle. The transverse bore 2 still connects the dispensing chamber 3 with the metering chamber 4 via the connecting passage 5.

At the beginning of the pressure reduction and lubricating phase, a central lubricating pump may build up the lubricant pressure in the main line and in the lubricant inlet 6, 6' to an operating pressure. The valve piston 1 is pushed forward by the operating pressure against the force of the first return spring 7 until the lubricant is released into the lateral passage 8 and to the metering chamber 4 in the valve housing 14 via the connecting passage 5. The lubricant supplied by the lubricant inlet 6 then reaches the metering chamber 4 via the connecting passage 5. The lubricant pressure developing in the metering chamber 4 acts on the dispensing piston 9 which is actuated pushed against the force of the second return spring 10. Simultaneously, the check pin section 18 (if provided) is pulled in. While the metering chamber 4 is filled up on one side of the dispensing piston 9, the dispensing piston is in a dispense position so as to have displaced (pushed) on the other side a metered lubricant volume under lubricant pressure from the dispensing chamber 3 against the force of the second return spring 10 to the open lubricant outlet 11. A lubrication manifold (not shown) is connected to the lubricant outlet 11. In the lubricating phase, the hydraulic operating pressure of the lubricating pump has a preset minimum value of e.g. 250 bar. At the completion of the lubricating phase, the dispensing piston 9 has displaced the metered lubricant volume from the dispensing chamber 3 to the lubricant outlet 11 (or 11') and, if so equipped, has moved by its extension 20 the valve piston 1 to an intermediate position in which the passage 8 to the connecting passage 5 is blocked by the rear part of the valve piston 1. The distributor element remains in this position until a pressure relief valve on the lubricating pump is actuated.

In order to make it possible for the distributor element to reverse, the lubricant line between the lubricating pump and the lubricant inlet 6 of the distributor element is depressurized at the completion of lubrication in a subsequent pressure relief phase. If the first return spring 7 is dimensioned accordingly, a smaller pressure reduction to a desired residual pressure of e.g. 90 bar (compared to 45 bar for the usual distributor elements) is sufficient. The first return spring 7 then pushes the valve piston 1 from the intermediate position first taken up (downward) into the final position shown in FIG. 1 (representing the starting position for the following lubricating cycle). Now the metering chamber 4 is connected again with the dispensing chamber 3 via the connecting passage 5, the released passage 8 and the bore 2.

The second return spring 10 can now transfer lubricant present in the metering chamber 4 to the dispensing chamber 3 and fill it using the above route. When the dispensing piston 9 has reached its upper final position as shown in FIG. 1 through the action of the second return spring 10, the distributor as a whole has returned to its starting position in this lubricating cycle and a new cycle can begin. The rating of the second return spring 10 independent of the first return spring 7 ensures the desired low minimum operating pressure.

The basic functioning of the embodiments shown in FIGS. 2 and 2A of a distributor element as per the present invention is not different from the distributor element shown in the FIGS. 1 to 1B2. However, where the construction of this distributor element is different is the fact that the supporting body 12 is designed as an elongated cylindrical body coaxial with the two return springs 7 and 10 and that this body accommodates the top part of the first return spring 7. The first return spring 7 is braced at a radially inward projecting flange 24 at the upper end of the supporting body 12 opposite the valve piston 1. Conversely, the end of second return spring 10 closest to valve piston 1 surrounds the cylindrical body 12 and is braced on a radially outward projecting bottom flange 23 of the supporting body 12. In this manner, the two return springs 7, 10 can be relatively long and have appropriate spring characteristics despite the length of the distributor element remaining the same.

LIST OF REFERENCE SYMBOLS

1 Valve piston
2 Bore
3 Dispensing chamber
4 Metering chamber
5 Connecting passage
6, 6' Lubricant inlet, lubricant inlet passage
7 First return spring
8 Passage
9 Dispensing piston
10 Second return spring
11, 11' Lubricant outlet or passage
12 Supporting body
13 Passage
14 Valve housing
15 Threaded connection
16 Lower sealing body
17 Peripheral seal
18 Check pin section
19 Upper sealing body
20 Extension
21 Screw plug
22 Bearing shoulder
23 Bottom flange
24 Flange

The invention claimed is:

1. A distributor element for metering lubricant for lubricating installations, said distributor element comprising:
    a housing having a lubricant inlet, a connecting passage, and a lubricant outlet;
    a valve piston having a bore for allowing lubricant to flow therethrough, said valve piston being operable to move within said housing under pressure from a lubricant entering said housing through said lubricant inlet;
    a first return spring for applying a pressure against said valve piston to oppose the pressure from the lubricant entering said housing through said lubricant inlet;
    a dispensing piston operable to move within said housing under pressure from lubricant entering a metering chamber of said housing via said connecting passage;
    a second return spring for applying a pressure against said dispensing piston to oppose the pressure from the lubricant within said metering chamber; and
    a hollow supporting body arranged within said housing between said first return spring and said second return spring such that said hollow supporting body supports and provides leverage for each of said first return spring and said second return spring;
    wherein said valve piston is operable to move within said housing between:
        (i) a valve piston starting position, whereat said valve piston is positioned such that said bore of said valve piston allows a dispensing chamber between said dispensing piston and said valve piston to communicate with said metering chamber via said connecting passage;
        (ii) a metering position, whereat said valve piston allows said lubricant inlet to communicate with said metering chamber via said connecting passage; and
        (iii) an intermediate position whereat said valve piston blocks said lubricant inlet from communicating with said metering chamber via said connecting passage, and blocks said dispensing chamber from communicating with said metering chamber via said connecting passage;
    wherein said dispensing piston is operable to move within said housing from a dispensing piston starting position, whereat a volume of said metering chamber is a minimum, to a dispense position, whereat said dispensing piston has displaced the lubricant present in said dispensing chamber through said lubricant outlet and has moved said valve piston from said metering position to said intermediate position; and
    wherein, upon pressure relief at said lubricant inlet, said valve piston is operable to be moved back from said intermediate position to said valve piston starting position by said first return spring, and said dispensing piston is operable to be moved back from said dispense position to said dispensing piston starting position by said second return spring.

2. The distributor element of claim 1, wherein said valve piston, said dispensing piston, said hollow supporting body, said first return spring, and said second return spring are arranged in an axial configuration in a common passage of said housing.

3. The distributor element of claim 1, wherein said second return spring comprises a spiral coiled spring surrounding said dispensing piston.

4. The distributor element of claim 3, wherein said second return spring is arranged so as to surround said first return spring, said first return spring comprising a spiral coiled spring.

5. The distributor element of claim 1, wherein said first return spring comprises a spiral coiled spring and is accommodated in said hollow supporting body such that an end of said first return spring faces said dispensing piston, and such that said first return spring is surrounded by said second return spring, said second return spring comprising a spiral coiled spring.

6. The distributor element of claim 5, wherein said second return spring is braced on a bottom flange of said hollow supporting body.

7. The distributor element of claim 1, wherein said hollow supporting body is braced on a bearing shoulder of said housing, said housing having a first end whereat said valve piston is located, and said housing having a second end located opposite said first end, said bearing shoulder being located at said second end of said housing opposite from said first end where said valve piston is located.

8. The distributor element of claim 7, wherein said valve piston, said dispensing piston, said hollow supporting body, said first return spring, and said second return spring are arranged in an axial configuration in a common passage of said housing.

9. The distributor element of claim 1, wherein said hollow supporting body is fixed in position within a common passage of said housing, said common passage being divided into said metering chamber between said dispensing piston and a first end of said housing, and said dispensing chamber between said dispensing piston and said valve piston, said lubricant inlet being located at a second end of said housing opposite said first end.

* * * * *